Oct. 18, 1932.   H. S. PARDEE   1,882,873
BRAKE
Filed May 8, 1929   3 Sheets-Sheet 1
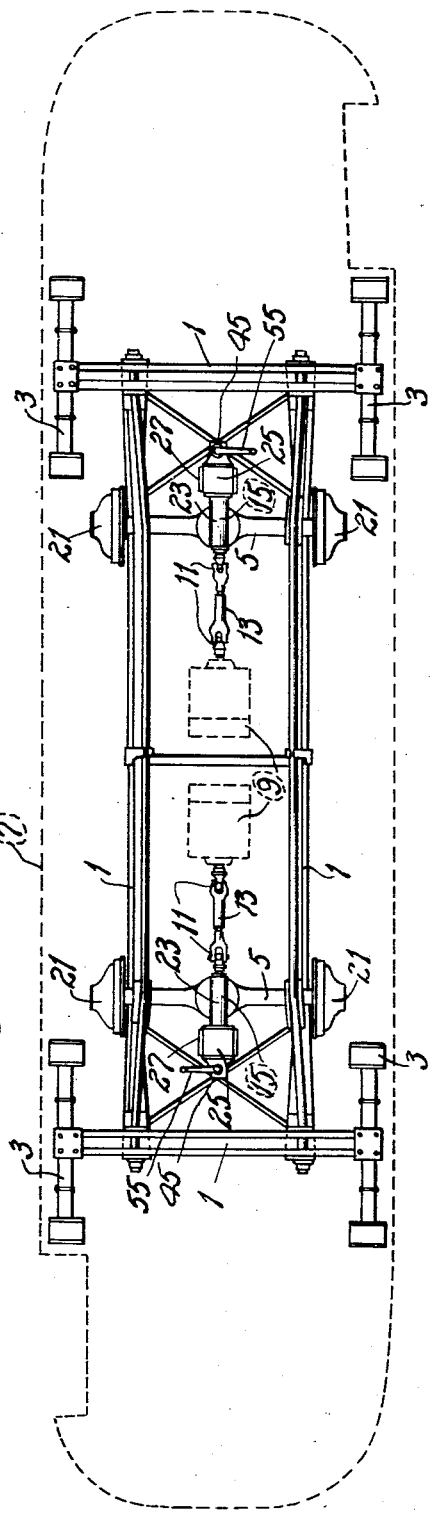
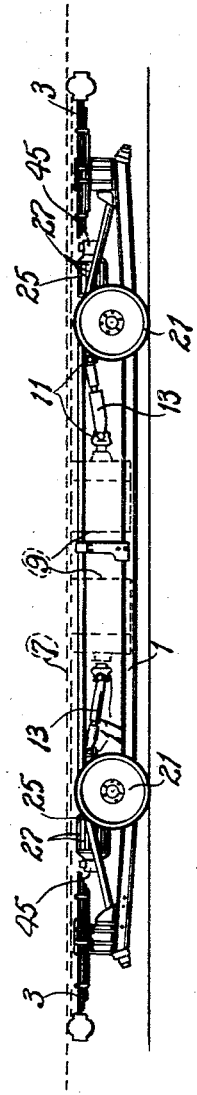
Harvey S. Pardee
Inventor,
Deloz G. Haynes,
Attorney

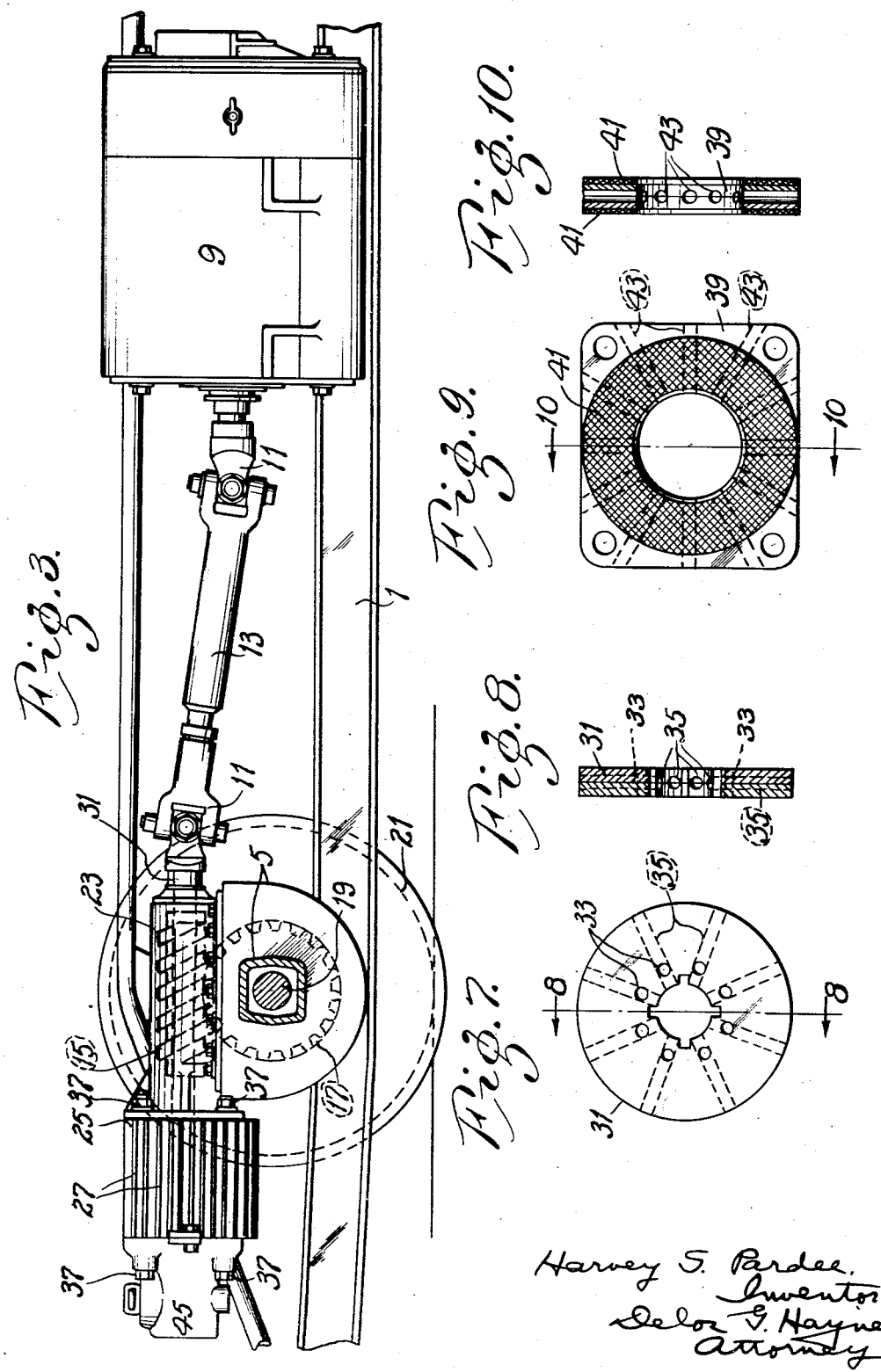

Oct. 18, 1932.         H. S. PARDEE         1,882,873
                          BRAKE
              Filed May 8, 1929      3 Sheets-Sheet 3

Patented Oct. 18, 1932

1,882,873

UNITED STATES PATENT OFFICE

HARVEY S. PARDEE, OF RAVINIA, ILLINOIS, ASSIGNOR TO JOHN ROBERT BLACKHALL, OF HIGHWOOD, ILLINOIS

BRAKE

Application filed May 8, 1929. Serial No. 361,277.

This invention relates to brakes, and with regard to certain more specific features to vehicle brakes of a type more especially adapted for rail car operation.

Among the several objects of the invention may be noted the provision of an improved braking system for use in effecting final deceleration of a car after previous dynamic braking has been used for absorbing most of the kinetic energy at the higher speeds and the provision of a brake of the class described which is compact, self-contained, readily replaceable and totally enclosed for protection from dirt, grit and atmospheric conditions. Other objects will be in part obvious and in part pointed out hereinafter.

The invention accordingly comprises the elements and combination of elements, features of construction, and arrangements of parts, steps and sequence of steps which will be exemplified in the structure hereinafter described and the scope of the application of which will be indicated in the following claims.

In the accompanying drawings in which is illustrated one of various possible embodiments of the invention, Fig. 1 is a plan view of a railway car chassis showing two new and improved brakes;

Fig. 2 is a side elevation of Fig. 1;

Fig. 3 is an enlarged fragmentary side elevation illustrating a single driving and braking unit;

Fig. 7 is a plan view of certain splined movable brake discs;

Fig. 8 is a cross section taken on line 8—8 of Fig. 7;

Fig. 9 is a plan view of certain stationary brake discs; and,

Fig. 10 is a cross section taken on line 10—10 of Fig. 9.

Similar reference characters indicate corresponding parts throughout the several views of the drawings.

Figure 4:
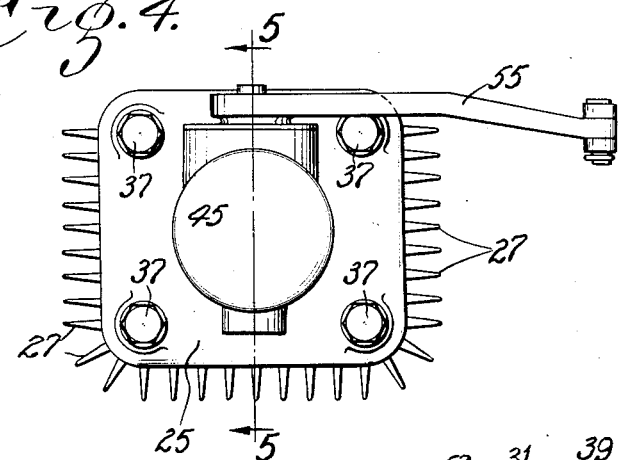
Fig. 4 is an end view of a braking unit.

Referring now more particularly to Fig. 1, there is illustrated at numeral 1 the frame of a two-axle electric railway truck having suitable supporting springs 3, said truck being supported upon axle housings 5. A car body 7 rests upon the springs 3.

The car is driven by a set of motors 9 suitably supported from the frame 1, each of the motors transmitting its energy through universal joints 11 and a drive shaft 13, the said driving elements 11 and 13 coupling with a worm 15 mounted in a housing member 23 associated with one of said housings 5 (see Fig. 3). The worm 15 meshes with a worm wheel 17, the latter being connected for driving purposes with the axle 19 to which wheels 21 are fastened. The axle 19 is preferably of the differential type but may be of the non-differential type. It will be seen from the above that by suitably controlling the flow of current to the motors 9 that movement of the vehicle may be controlled, either forwardly or in reverse.

In decelerating the car, the motors 9 are converted into generating units and the kinetic energy of the car is used for producing current which may be used either for heating the car, throwing back current to the line or in dissipating heat to the atmosphere through resistors. Thus most of the kinetic energy of the car during deceleration is converted dynamically but it has been found that it is not suitable to effect a final deceleration dynamically, both because there is not enough energy left to make it worth while to conserve and because the deceleration effect of the generators is decreased to such an extent as the speed of the car decreases that the time element in effecting a complete stop becomes too large. The present invention is preferably used to decelerlate after the car has decreased in speed to approximately three miles per hour and is used to bring the car to a complete stop.

Figure 5:
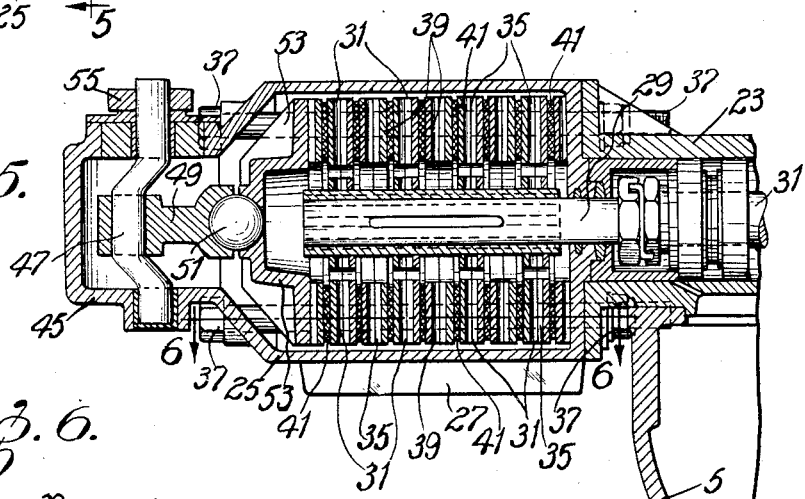
Fig. 5 is a longitudinal section taken substantially on line 5—5 of Fig. 4.
Figure 6:
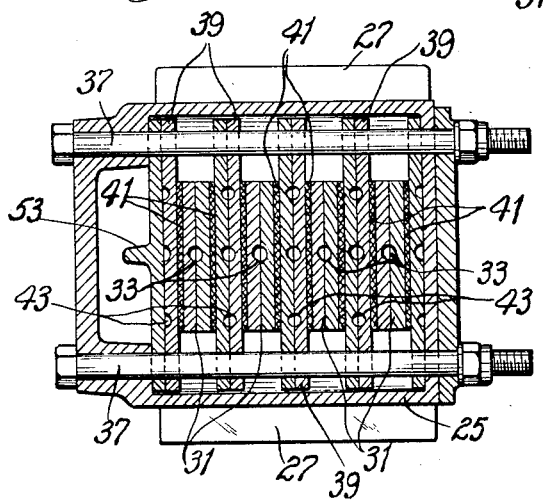
Fig. 6 is a cross section taken substantially on line 6—6 of Fig. 5.

Referring to Fig. 5, it will be seen that each worm housing 23 has bolted rearwardly thereon a brake retaining casing 25 having formed therewith cooling fins 27. This housing 23 surrounds a quill 29 extending from the shaft 31 of said worm 15. It is to be understood that the shaft 31 comprises part of the transmission mechanism and rotates therewith.

The quill or extension shaft 29 has splined thereto within the casing 25 a plurality of normally moving brake discs 31. These are mounted for sliding movement along the shaft but have no relative rotating movement with respect thereto, all rotative movement of these movable brake discs being with the quill 29. The discs 31 are not lined. Their construction is shown more in detail in Figs. 7 and 8 wherein lateral passages 33 are shown intersected by radial passages 35 for the purpose of effecting free circulation of any fluid which happens to be in a casing such as air or oil. This is for the purpose of conveying heat from the plates to the walls of the casing 25 and thence to the fins 27 for purposes of dissipation.

Held longitudinally in the casing 25 are four studs 37 upon which are slidably mounted a plurality of stationary plates 39, said stationary plates 39 alternating in longitudinal position with said plates 31. The plates 39 do not rotate but are free to move longitudinally on the studs. These plates 39 are lined with a suitable frictional lining, such as an asbestos or a like preparation 41, as indicated in Figs. 9 and 10. These plates 39 are also provided with radial passages 43 for circulating purposes, no lateral passages being required. It will be noted from Fig. 9 that there is no direct connection between the plates 39 and the shaft 29.

Formed at the rear of the casing 25 is a cap 45 which rotatably supports a crank 47, the latter having a pitman or connecting rod 49 pivoted thereto. The pitman 49 extends to and engages a ball 51, the ball in turn engaging a pressure plate 53 which, upon turning of the crank 47 is adapted to press the plates 31 and 39 together for frictional engagement. As indicated in Fig. 5, the ball 51 is nested within suitable sockets formed in the pitman 49 and plate 53 to form a ball-and-socket or universal joint or engagement, so that the resulting pressure on the plates is equalized. A lever 55 is provided outside of the cap 45 and on an extension of the crank 47 so that said crank may be manually or otherwise operated to effect a pressing together of the plates. It is to be understood that the crank 47 may have an eccentric or a cam substituted therefor.

The operation is clear from the above, namely, that when it is desired to decelerate the car, the lever 55 is swung one way or another, thereby rotating the crank 47 to move the pitman 49, with the result that the pressure plate 53 is forced to clamp together the juxtaposed discs. Inasmuch as the discs 39 are not rotating, the frictional effect between them and the then rotating discs 31 is to slow down the quill 29 associated with the worm 15. A large braking area is attainable in a small space because of the multiplication of discs.

It is to be understood that the pitch of the worm 15 (shown diagrammatically) is steep enough that the worm-and-wheel combination of which it is a part can function reversibly taken from a kinematic viewpoint. Hence when the car coasts, thereby effecting continued rotation of the wheels, they tend to cause turning of the worm 15, quill 29 and discs 31, with the result that kinetic energy may be delivered through the wheels to the discs 31, where it is converted to heat upon a clamping action being effected by discs 39. The destruction of the kinetic energy or conversion thereof into heat results in destruction of velocity of the system comprising the rail car. In order to better carry off the heat thus engendered the said circulatory ducts are used in the discs so that heat may be carried by convection to the case 25 and fins 27. In the present embodiment air is used in the case 25 and inasmuch as this air does not enter or leave the brake during use, the device is immune to the deleterious effects of dirt, grit, ice and the like.

It will be noted that the studs 37, as well as preventing the discs 39 from rotating, also hold the case 25 to the worm housing 23 and resist the torque due to braking.

It is to be undertsood that the crank 55 may be operated by a suitable mechanism such as for instance cables extending from the levers 55 to the center of the car where a hydraulic or pneumatic engine may be located in connection with an equalizer for operating the cables, said engine being suitably controlled by valves operable in the vehicle cab. Also, the above cables may be connected to a cable that runs to a manual emergency brake control at each end of the car, to be used for emergency braking and holding the car at rest.

It is to be understood that although this brake is designed primarily for final decelerative operation, that it may be designed for general decelerative purposes. In fact the device of the present disclosure would engender an allowable temperature use of the order of only 600° F. in stopping the car described in 7½ seconds from 30 miles per hour, if it were necessary to use it for this purpose.

It will be seen that the device is rendered exceedingly compact because of the fact that a worm drive has inherently a high velocity ratio. The result is that the quill 29 has a relatively high angular velocity with respect to the wheel so that upon deceleration, when the wheels are driving the quill, the quill has a relatively high velocity. This provides a high rubbing velocity between the moving and stationary discs so that greater friction is had with less pressure and smaller sizes of parts.

If the brake discs wear, it is only necessary to remove the four nuts holding the studs 37 in order to remove the whole brake from the quill and replace it with a new one. This also provides for disassembly of the parts of the removed, worn brake, which may then be readily repaired.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A vehicle brake comprising at least one disc slidably but non-rotatably held, at least one other disc slidably and rotatably held to a portion associated with the driving mechanism of said vehicle, a movable pressure plate for pressing said discs into frictional engagement, a crank, means pivoted to the crank and reaching to said pressure plate and a ball-and-socket universal arrangement interposed between said pivoting means and the pressure plate for equalizing purposes.

2. A vehicle brake comprising a plurality of discs slidably by non-rotatably held, a plurality of other discs slidably and rotatably held to a portion associated with the driving mechanism of said vehicle, a movable pressure plate for pressing said discs into frictional engagement, a crank, means pivoted to the crank and reaching to said pressure plate and a ball-and-socket arrangement interposed between said pivoting means and the pressure plate for equalizing purposes.

3. A vehicle drive and brake therefor comprising a drive shaft, a worm associated with said drive shaft, a worm wheel meshing with the worm and connected with an axle of the vehicle for driving purposes, a quill extending from the worm, movable discs splined to the quill, a housing surrounding the worm and wheel, a casing attached to said housing and surrounding the quill, said casing non-rotatably and slidably carrying stationary discs alternating with said movable discs and means for frictionally engaging all juxtaposed discs, said discs having circulatory ducts therein for conveying heat to said casing and means on the casing for dissipating said heat.

4. A vehicle drive and brake therefor comprising a drive shaft, a worm associated with said drive shaft, a worm wheel meshing with the worm and connected with an axle of the vehicle for driving purposes, a quill extending from the worm, movable discs splined to the quill, a housing surrounding the worm and wheel, a casing attached to said housing and surrounding the quill, said casing non-rotatably and slidably carrying stationary discs alternating with said movable discs, a pressure plate for frictionally engaging juxtaposed discs and means for operating said pressure plate including pressure equalizing means.

5. A vehicle drive and brake therefor comprising a drive shaft, a worm associated with said drive shaft, a worm wheel meshing with the worm and connected with an axle of the vehicle for driving purposes, a quill extending from the worm, movable discs splined to the quill, a housing surrounding the worm and wheel, a casing attached to said housing and surrounding the quill, said casing non-rotatably and slidably carrying stationary discs alternating with said movable discs, a pressure plate for frictionally engaging juxtaposed discs and means for operating said pressure plate including pressure equalizing means, said pressure equalizing means comprising a ball-and-socket joint located centrally of said pressure plate.

In testimony whereof, I have signed my name to this specification this third day of May, 1929.

HARVEY S. PARDEE.